Feb. 14, 1967   M. W. REYNOLDS   3,303,801
RUNNER APPARATUS FOR ORIENTATION PLANTING
Filed June 23, 1965
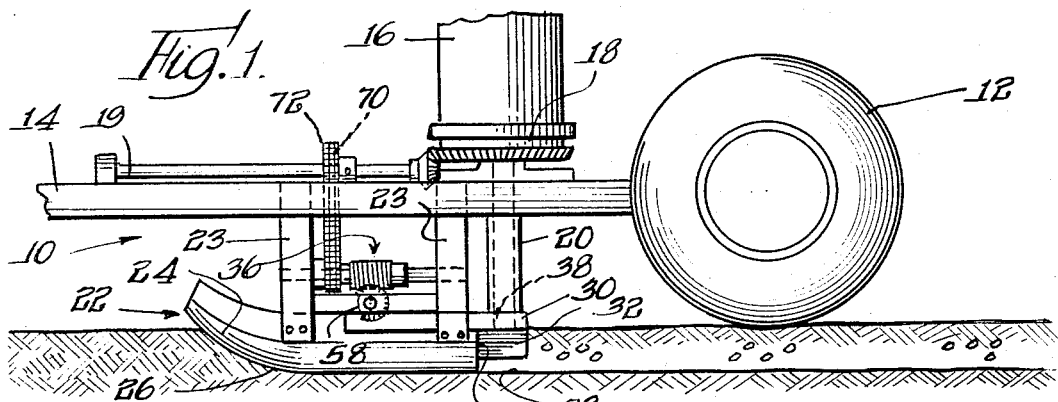
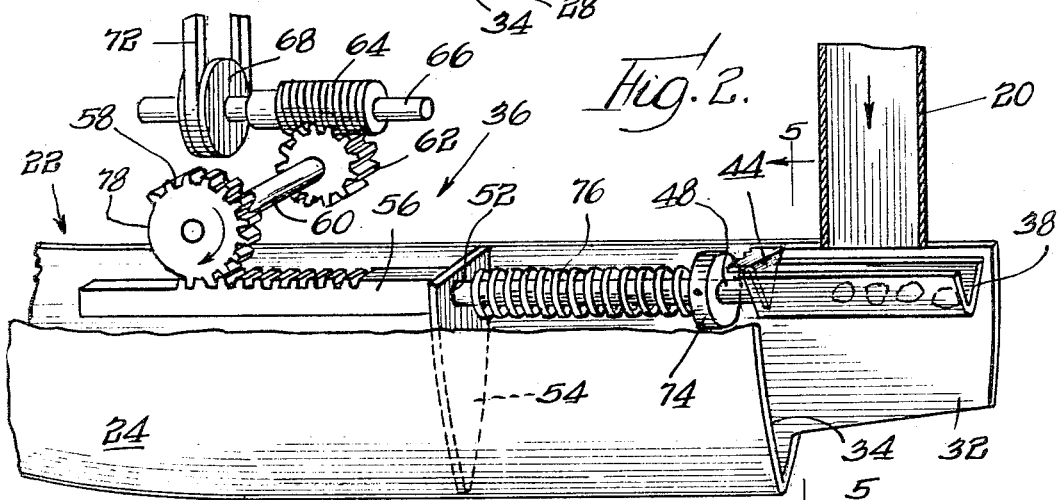
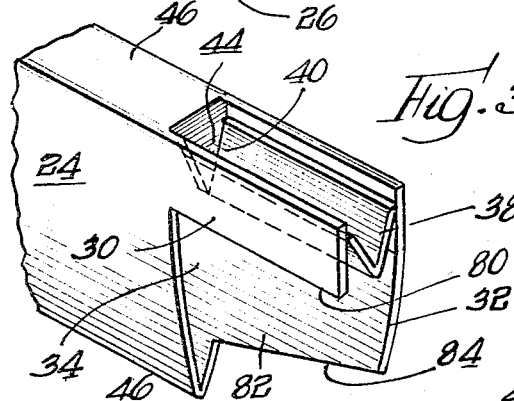
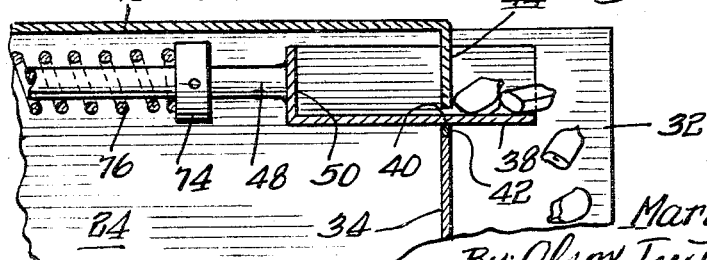
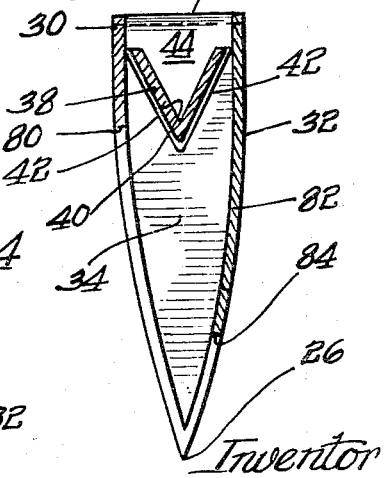
Inventor
Marlyn Ward Reynolds
By: Olson, Trexler, Wolters & Bushnell
attys.

United States Patent Office 3,303,801
Patented Feb. 14, 1967

3,303,801
RUNNER APPARATUS FOR ORIENTATION
PLANTING
Marlyn W. Reynolds, Grey Stone Acres,
Altona, Ill. 61414
Filed June 23, 1965, Ser. No. 466,243
5 Claims. (Cl. 111—86)

This invention relates generally to planting machines and more particularly to seed planters which are arranged to plant the seed in an oriented condition.

The seeds of many plants possess a geometry which renders them susceptible to mechanical orientation in a desired spatial position; and among the more widely planted field crops, the seeds of maize, or "corn" as it is known in the United States, is possessed of such a geometry. The typical kernel or seed of field corn possesses opposite, broad or generally flat sides of approximately triangular outline and interjacent curving, relatively narrow sides that taper from a dimpled top to a pointed tip. One of the flat sides is notched and gives rise to the sprouting embryo upon germination. Furthermore, the plan in which the leaves of the corn embryo emerge is located rather generally at right angles to the flat germ face, and the primary root projects straight away from the point of the kernel, growing in this direction for some distance.

Various devices have been developed in the past to take advantage of the geometry of the corn kernel in planting it with the flat sides disposed vertically and positioned parallel to the longitudinal axis of the row being planted. So positioned the axis of the kernel which runs from its dimpled top to its pointed tip is correspondingly oriented in a vertical plane aligned with the row being planted. Numerous advantages obtain from so planting the corn kernels. The leaves of the plant tend to grow out into the spaces between the rows rather than overlapping within the row, thus shading the soil to conserve moisture and control weeds and exposing greater leaf surface to the sunlight. Orientation planting also tends to preserve the emerging primary root from damage or even total severance during close cultivation; and there are indications that orientation planting facilitates eventual picking of the matured ears.

The devices heretofore developed for orientation planting have relied on mechanically moving parts to achieve orientation of the seed, thereby leading to certain expenses in equipment and certain inconveniences in mounting the planting apparatus to the field vehicle. The present invention overcomes this limitation of the prior art and takes as an important object the provision of planting apparatus which achieves seed orientation without reliance on mechanically moving parts.

A more general object of the invention is to provide new and improved seed planting apparatus.

Another object of the invention is to provide orientation planting apparatus which takes advantage of the relative movement of the planting implement and the earth in achieving orientation.

Still another object of the invention is to provide orientation planting apparatus which is adaptable to hill planting.

These and other objects and features of the invention will become more apparent from a consideration of the following descriptions.

Planting apparatus in accord with the invention includes a furrow-forming runner or blade implement having a heel portion and a pair of wall members which extend rearwardly of the heel portion in horizontally spaced, generally parallel relationship. One of these wall members includes a lower portion that extends vertically beyond the lower edge of the other wall member, this lower portion being relatively stationary with respect to the seed passing downwardly between the wall members. Correspondingly, the earth that is exposed beneath the aforementioned lower edge is moving relative to these seeds upon forward transport of the runner. In this arrangement, the relative motion of the earth and the aforementioned lower portion orients the seeds generally with their flat sides disposed vertically.

The invention, as both to its structure and its mode of operation, will be better understood by reference to the following disclosure and drawing forming a part thereof, wherein:

FIG. 1 is an elevational view of orientation planting aapparatus constructed in compliance with the principles of the invention, this apparatus being shown mounted on a field vehicle and arranged for hill planting;

FIG. 2 is an enlarged perspective view of the ground-engaging runner, the cooperating seed-supply chute and the associated seed-drop regulating arrangement, a portion of the runner being broken away to facilitate illustration;

FIG. 3 is an enlarged perspective view of the rearward end of the runner showing its heel portion and the cooperating wall members;

FIG. 4 is an enlarged, vertical side elevational view in cross-section showing the seed-drop regulating arrangement operated to discharge collected seeds between the wall members of the runner; and FIG. 5 is a somewhat enlarged, rear elevational view taken substantially along the line 5—5 of FIG. 2

Referring now in detail to the drawing, specifically to FIG. 1, a planter which embodies the principles of the invention is indicated there generally by the reference numeral 10. The planter 10 is adapted for transport by means of a field vehicle, one wheel of this vehicle being indicated at 12 and the frame of this vehicle being indicated at 14. A hopper 16 is supported on the frame 14 to define a source of reservoir for seeds to be planted, and the hopper 16 carries the seed in random orientation. In addition, the hopper 16 is provided with a release mechanism 18 which is driven from a rotatable shaft 19; and the release mechanism 18 operates so as to drop the seed one at a time into a generally tubular chute 20. Forwardly of the chute 20, a ground-engaging runner unit 22 is mounted to the frame 14 by means of arms 23.

The runner unit 22 includes a hollow blade member 24 the lateral sides of which converge downwardly to a bottom edge 26, the blade 24 thereby being capable of cutting a narrow furrow 28 in the earth through which the blade is drawn. The runner unit 22 also includes a shallow wall member 30 and a deep wall member 32 which extend rearwardly of a heel portion 34 of the blade 24. These wall members cooperate to promote orientation of the seeds passing from chute 20 as will be described more fully hereinafter. Although the seed orientation which is achieved by the cooperating runner blade 24 and the wall members 30 and 32 is applicable to either drill or hill planting, special advantages are derived from use of the runner unit of the present invention in hill planting operations; and accordingly, the runner unit 22 is shown in conjunction with a seed-drop regulating unit 36 which acts to control the passage of seeds from the chute 20.

The seed-drop regulating unit 36 includes a rearwardly extending leaf element 38, best shown in FIGS. 2–5; and this leaf element, in the illustrated embodiment, is provided as an upwardly opening channel of V-shaped cross-section. The wall members 30 and 32 are horizontally spaced in generally parallel relationship in compliance with the showing of FIG. 3, in order to admit the leaf element 38 therebetween. In addition, the leaf element 38 is normally situated between the wall members 30 and 32 whereby to intercept seeds passing from the chute 20; and to allow periodic withdrawal of the leaf element from this position, the heel portion 34 of the runner blade 24 is fashioned with a cooperatively shaped aperture 40 which permits horizontally slidably forwardly withdrawing of the leaf element from beneath the chute 20. As is shown in FIGS. 4 and 5, the edges of aperture 40 may be lined with bearing material 42 to facilitate the sliding action of leaf element 38.

In order to scrape the deposited seeds from leaf element 38 upon its forward retraction, a seed-stop member 44 is positioned positively with respect to the blade 24 and is shaped to fit into the channel of leaf element 38. As is shown in FIG. 4, the seed-stop member 44 may advantageously be connected to the runner 24 by merging into a top plate portion 46 thereof. In order to cooperate with the seed-stop member 44 and the leaf element 38, the seed-drop regulating unit 36 additionally comprises a periodic drive which is connected to the leaf element and which is operative to pull the leaf element forwardly of the seed-stop member, thus acting to dump seeds previously collected on the leaf element into the space between the wall members 30 and 32. More specifically, the connection to leaf element 38 is made by means of a tongue which includes a shaft 48 that is bolted, welded or otherwise suitably secured to an upright, forward wall portion 50 of the leaf element, as is shown in FIG. 4. Shaft 48 slides through a circular aperture 52 that is formed in a transverse plate 54, shown in FIG. 2, plate 54 being mounted within the interior of runner 24. Forwardly of the plate 54, the shaft 48 merges with a rack element 56, the upper surface of which is provided with teeth that mesh with the toothed portion of a drive gear 58. Gear 58 is mounted on a transverse shaft 60 spaced from a worm gear 62, and worm gear 62 meshes with a worm 64 that is fastened on a longitudinal shaft 66. Shaft 66 also carries a pulley 68 for drivingly coupling shaft 66 and worm 64 to a pulley 70 that is carried on rotatable shaft 19, as is shown in FIG. 1. A V-belt 72 is conveniently employed in interconnecting pulleys 68 and 70.

Returning to a consideration of FIGS. 2 and 4, a collar 74 is secured to shaft 48 to act as a retainer for a compression spring 76, spring 76 encircling shaft 48 between collar 74 and the transverse plate 54. Functionally, the spring 76 is intended to bias the leaf element 38 generally into extended position between the wall members 30 and 32. By means of the teeth on rack element 56 meshing with the teeth on gear 58, the leaf element 38 is coupled to the rotary drive for pulling the leaf element forwardly and against the reaction of spring 76. This action dumps seeds which have been collected on the leaf element into the space between the wall members 30 and 32 in compliance with the showing of FIG. 4. Since the leaf element is to be normally disposed between the wall members 30 and 32 for collecting seed passed from chute 20, decoupling means must also be provided for periodically releasing the leaf to the action of the biasing spring 76. This decoupling is achieved by providing a smooth, untoothed surface 78 on spur gear 58, the angular extent of this smooth portion cooperating with the speed of the drive to produce the desired speed of reciprocating action in the leaf element 38 and the corresponding seed-drop rate. Thus, the regulating unit 36 acts to provide a valving action for the seeds passing downwardly through the chute 20 whereby to pass the seeds in groups so as to achieve the desired drop for hill planting. It is to be recognized that the various factors involved can be altered to place two, three or four seeds in each hill as is desired.

In compliance with the features of the present invention, the seeds that are delivered by the chute 20 are oriented into a desired spatial position without mechanically moving parts and by taking advantage of the relative movement of the planting implement and the earth in which it is operated. More specifically and with reference to FIG. 3, the wall members 30 and 32 are horizontally spaced and disposed in generally parallel relationship. One of these walls members, specifically the shallow wall member 30 is fashioned with a lower edge 80 that defines its vertical terminus. Cooperatively, the deep wall member 32 comprises a lower portion 82 that extends vertically beyond the lower edge 80. As will be seen in FIG. 5, the lower portion 82 is substantially vertical, although it may take a slight curvature in correspondence with the general shape of the blade 24. Moreover, portion 82 is provided with a lower edge 84 that is spaced above the bottom edge 26 of the blade 24. Advantageously, the longitudinal extent of wall members 30 and 32 is made as great as is convenient and practical considering the use of the runner unit.

Having thus described one construction of the runner unit of the invention, its arrangement with a field vehicle, and the construction and operation of a cooperating seed-drop regulating unit, it will be valuable now to describe the manner in which orientation of the seed is achieved by the runner unit.

Assuming that the planter 10 is being carried over a suitably prepared field with the blade 24 riding in the surface of the earth, specifically with the erathline residing above the lower edge 80 of shallow wall member 30 but below the upper edge thereof, release of seed from the leaf element 38 by the retraction of that element forwardly permits the seed to the fall between the wall members 30 and 32 and downwardly into the furrow 28 being formed by the blade 24. Since the blade 24 is being drawn forwardly by the field vehicle, the seed falling from the forwardly retracted leaf element may be considered as being, at the moment of release, stationary with respect to the wall members 30 and 32 and moving with respect to the sidewall of the furrow exposed beneath the lower edge 80 of shallow wall member 30. Furthermore, since the furrow 28 is narrow and since the earth at time of planting is more nearly free-flowing than plastic, the walls of the furrow are incipiently collapsing at the rear of the runner and beneath the lower edge 80 of the shallow wall member 30. Accordingly, there is relative movement between the incipiently collapsing wall of the furrow beneath the wall member 30 and the lower portion 82 of the deep wall member 32. This relative motion between the earth and the portion 82 acts to orient the seeds or kernels dropped into this region by the retraction of leaf element 38. The relative movement of the earth and the deep wall member tends to wipe or turn the seeds into a position most stable with respect to the wall member 32, i.e. a position of the seeds in which their relatively flat sides are disposed parallel with respect to the plane of portion 82 and generally vertically; and as has been described hereinabove, the lower portion 82 of the deep wall member 32 is made as deep and as long as practical within the limits of convenience in order to maximize the orienting effect. Nonetheless, it is not advantageous to extend the lower portion 82 to the bottom edge 26 of blade 24 because it is desirable to have some minimal collapse of the opposite furrow walls beneath the placed seed.

It is recognized that the orientation achieved by the runner unit 22 will obtain upon de-activation of the seed-drop regulating unit 36 whereby to permit drill planting.

The drawing and the above description are not intended to represent the only possible form of my invention in regard to the details of construction. Changes in form and in the proportion of parts as well as the substitution of equivalents are contemplated as circumstances may suggest or render expedient; and although specific terms have been employed, they are intended in a generic and The invention is claimed as follows:

1. In an apparatus for planting seeds with their flat sides disposed vertically, a runner unit comprising: ground-engaging means including furrow-forming blade means having a heel portion and first and second wall members extending rearwardly of said heel portion in horizontally spaced, generally parallel relationship, one of said wall members including a lower portion extending vertically beyond the lower edge of the other wall member, said lower portion being relatively stationary with respect to seeds passing downwardly between said wall members, the earth exposed beneath said lower edge being relatively movable with respect to said seeds upon forward transport of said ground-engaging means, whereby the relative motion of said earth and said lower portion orients said seeds generally with their flat sides disposed vertically.

2. Apparatus for planting seeds with their flat sides disposed vertically, said apparatus comprising: ground-engaging means including furrow-forming blade means having a heel portion and first and second wall members extending rearwardly of said heel portion in horizontally spaced, generally parallel relationship, one of said wall members including a lower portion extending vertically beyond the lower edge of the other wall member, said lower portion being relatively stationary with respect to seeds passing downwardly between said wall members, the earth exposed beneath said lower edge being relatively movable with respect to said seeds upon forward transport of said ground-engaging means, whereby the relative motion of said earth and said lower portion orients said seeds generally with their flat sides disposed vertically; seed supply means, including a delivery chute aligned with said wall members to drop seeds therebetween; and seed-drop regulating means for controlling the passage of seeds from said chute to the space between said wall members.

3. Apparatus for planting seeds with their flat sides disposed vertically, said apparatus comprising: ground-engaging means including furrow-forming blade means having a heel portion and having first and second wall members extending rearwardly of said heel portion in horizontally spaced, generally parallel relationship, said heel portion including aperture means opening into the space between said wall members and seed-stop means generally overlying said aperture means, one of said wall members including a lower portion extending vertically beyond the lower edge of the other wall member, said lower portion being relatively stationary with respect to seeds passing downwardly between said wall members, the earth exposed beneath said lower edge being relatively movable with respect to said seeds upon forward transport of said ground-engaging means, whereby the relative motion of said earth and said lower portion orients said seeds generally with their flat sides disposed vertically; seed supply means, including a delivery chute aligned with said wall members to drop seeds therebetween; and seed-drop regulating means for controlling the passage of seeds from said chute to the space between said wall members, including a leaf element normally situated between said wall members to intercept seeds from said chute and horizontally slidably disposed in said aperture means, said regulating means further including periodic drive means connected to said leaf element and operative to pull said leaf element forwardly of said seed-stop means whereby to dump seeds previously collected on said leaf element into the space between said wall members.

4. Apparatus in accordance with claim 3 wherein said leaf element has a V-shaped cross-section and said aperture means defines a mating opening for guidable cooperation with said leaf element.

5. Apparatus according to claim 3 wherein said apparatus further comprises spring means biasing said leaf element into position between said wall members and wherein said drive means includes tongue means rigidly mounted to said leaf element, a rotatable member, and operating means connected to said rotatable member and including coupling means periodically engageable with said tongue means for pulling said leaf element forwardly and further including decoupling means periodically releasing said leaf element to the action of said spring means.

References Cited by the Examiner

UNITED STATES PATENTS

| | | | |
|---|---|---|---|
| 3,134,346 | 5/1964 | Mann | 111—86 |
| 3,195,485 | 7/1965 | Reynolds | 111—86 |
| 3,217,674 | 11/1965 | Williams | 111—86 |

ANTONIO F. GUIDA, *Acting Primary Examiner.*

ROBERT E. BAGWILL, *Examiner.*